United States Patent [19]

Uchida et al.

[11] Patent Number: 4,657,121

[45] Date of Patent: Apr. 14, 1987

[54] IMPACTIVE ENERGY ABSORBING STRUCTURE

[75] Inventors: Sadao Uchida, Ichinomiya; Mitsuru Harata, Nagoya, both of Japan

[73] Assignee: Toyoda Gosei Co., Ltd., Nishikasugai, Japan

[21] Appl. No.: 701,249

[22] Filed: Apr. 12, 1985

[30] Foreign Application Priority Data

Feb. 13, 1984 [JP] Japan .................................. 59-025857

[51] Int. Cl.[4] ........................ B60R 21/02; F16F 7/12
[52] U.S. Cl. .................................... 188/376; 280/750
[58] Field of Search ....................... 280/750, 751, 752; 293/102, 109, 110, 120; 296/189; 188/371, 376, 377; 74/552, 558.5; 267/63 R

[56] References Cited

U.S. PATENT DOCUMENTS

| | | | |
|---|---|---|---|
| 2,727,738 | 12/1955 | Lindley | 267/63 R |
| 3,103,348 | 9/1963 | Paulsen | 267/63 R |
| 3,167,974 | 2/1965 | Wilfert | 74/552 |
| 3,493,244 | 2/1970 | Bozich | 280/750 |
| 3,887,223 | 6/1975 | Bez | 188/371 |
| 3,981,114 | 9/1976 | Chupick | 188/371 |
| 4,390,193 | 6/1983 | Strahan | 280/750 |

FOREIGN PATENT DOCUMENTS 1292825  5/1962  France .................. 280/750

Primary Examiner—John J. Love
Assistant Examiner—Karin L. Ferriter
Attorney, Agent, or Firm—Cushman, Darby & Cushman

[57] ABSTRACT

An impact energy absorbing structure for attachment to the boss of a steering wheel in an automobile is disclosed. It comprises an energy absorbing member made of brittle plastic material and a cover member. It has empty spaces formed between the central part and the outer peripheral part of the energy absorbing member to give rise to an external wall part breakable under an impactive load in the outer peripheral part of the energy absorption member. Owing to this arrangement, the impactive energy absorbing structure of this invention is enabled to maximize the amount of energy absorption and enhance the energy absorption efficiency to a great extent.

9 Claims, 11 Drawing Figures

IMPACTIVE ENERGY ABSORBING STRUCTURE

BACKGROUND OF THE INVENTION

(1) Field of the Invention

This invention relates to an impactive energy absorbing structure to be attached to the boss of a steering wheel in an automobile, and more particularly to an impactive energy absorbing structure consisting of an energy absorbing member of a brittle plastic material and a cover member.

(2) Description of the Prior Art

As an impactive energy absorbing structure for attachment to the boss of a steering wheel, there has been proposed an arrangement which, as illustrated in cross section in FIG. 1, comprises an energy absorbing member 2 molded of a brittle plastic material in a solid structure of prescribed shape, an insert 3 adapted to embrace the energy absorbing structure 2 and retain the external shape thereof, and a cover member 4 of a flexible plastic material serving to envelop the insert 3.

Generally, the energy absorption efficiency of the impactive energy absorbing structure is calculated by the formula, S/(Lmax X Dmax) (wherein S denotes the amount of energy absorbed, Lmax the value of the maximum allowale load, and Dmax the amount of the maximum deformation). Since the value of the maximum allowable load, Lmax, and the amount of the maximum deformation, Dmax, are fixed in advance by the shape and other specification of the structure, the energy absorption efficiency increases in proportion as the amount of energy absorbed, S, increases.

The energy absorption characteristic of the cover member 4 of the conventional impactive energy absorbing structure is as indicated by the curve b and that of the energy absorbing member 2 of the same structure is as indicated by the curve c respective shown in the graph of FIG. 2. The energy absorption characteristic of the aforementioned structure as a whole is represented by the curve a which is the sum of the curve b and the curve c. The amount of energy absorbed, S, in this case, therefore, falls in the area S enclosed with the curve a and the x axis. Thus, because of the blank part which occurs between the curve a and the line of the maximum allowable load, Lmax, the conventional impactive energy absorbing structure is not allowed to increase the amount of energy absorption, S, to the maximum. It has suffered from the problem of insufficient energy absorption efficiency.

SUMMARY OF THE INVENTION

This invention relates to an impactive energy absorbing structure composed of an energy absorbing member of a brittle plastic material and a cover member and adapted to be attached to the boss of a steering wheel, which structure includes empty spaces formed between a central part of the absorbing structure and an outer peripheral part of the energy absorbing structure which thereby forms an external wall part that is breakable under an impactive load in the outer peripheral part of the energy absorbing structure.

An object of this invention, therefore, is to provide an impactive energy absorbing structure which enables the amount of absorbed energy to be increased to the maximum and, therefore, manifests an outstanding energy absorption efficient.

BRIEF DESCRIPTION OF THE DRAWINGS

FIG. 3 representing a front view of an energy absorbing member,

FIG. 4 representing a cross-sectional view taken through FIG. 3 along the line II—II, FIG. 5 representing a cross-sectional view of an impactive energy absorbing structure, FIG. 6 and FIG. 7 representing diagrams depicting deformation occurring in the energy absorbing member, and FIG. 8 representing a graph showing the energy absorption characteristic curves of the structure.

DESCRIPTION OF THE PREFERRED EMBODIMENTS

Figure 3:
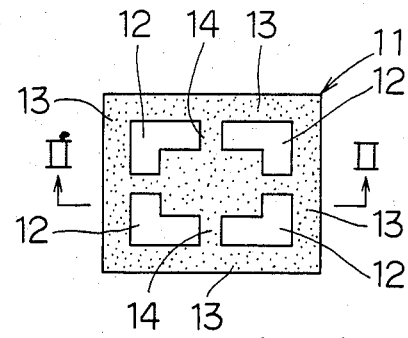
Figure 4:
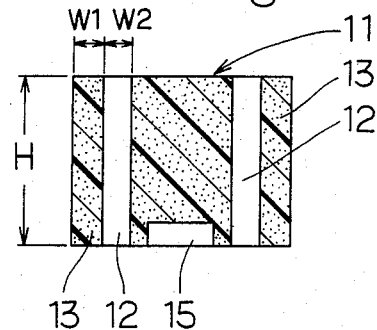
Figure 5:
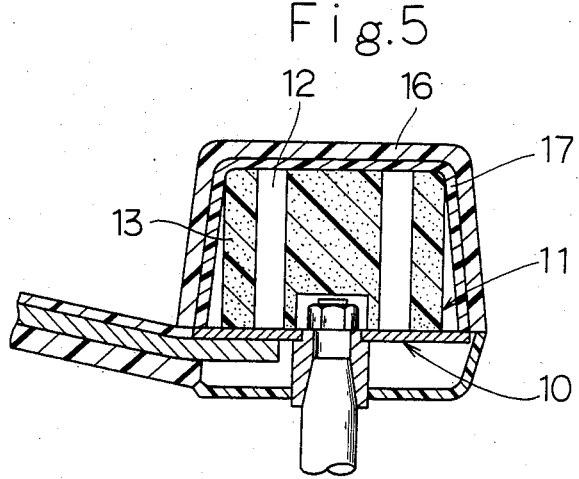

FIG. 3 is a plan view of an energy absorbing member 11, FIG. 4 is a cross-sectional view taken through FIG. 3 along the line II—II, and FIG. 5 a cross-sectional diagram of an impactive energy absorbing structure attached to the boss 10 of a steering wheel. The energy absorbing member 11 is molded of a brittle plastic material such as rigid foamed polyurethane or polystyrene. In construction, it interposes vertically through empty spaces 12 between a substantially cubic central part and an outer peripheral part thereof and thereby gives rise to an external wall part 13 in the substantially cubic outer periphery. Numeral 14 denotes ribs with one provided at each of four points about the absorbing member 11 and between it and wall 13 for the purpose of connecting the external wall part 13 and the central part 11 numeral 15 denotes a depression for admitting a fastening nut of the boss 10. The thickness, $W_1$, of the external wall part 13 of the energy absorbing member 11 is selected to be about H/5 where H stands for the height of the energy absorbing member 11. The thickness, $W_2$, of the empty spaces 12 is similarly selected to be about H/5. This thickness $W_1$ of the external wall part 13 is so selected that when a substantially spherical member disposed above the energy absorbing member 11 exerts an impactive load upon the energy absorbing member 11, the external wall part 13 breaks at a proper point and thereafter the central part alone assumes the role of absorbing the load. The thickness, $W_1$, of the external wall part 13 does not exceed H/2 even at its maximum.

The energy absorbing member 11 of brittle plastic material in which the empty spaces 12 formed in the substantially cubic main body thereof give rise to an external wall part 13 of a prescribed thickness in the periphery is attached to the top of the boss 10 of a steering wheel as illustrated in FIG. 5. The cover member 16 separately molded is placed to crown the energy absorbing member 11 and secured to the boss 10. This cover member 16 is molded of a flexible plastic material such as flexible polyurethane, PVC, or a flexible foam thereof, with an insert 17 set in place therein.

Figure 8:
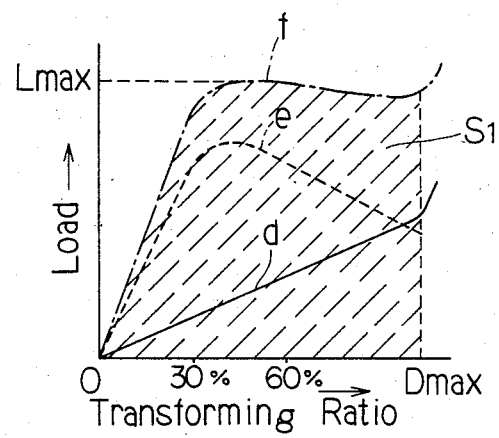
FIGS. 3–8 illustrate one embodiment of this invention.
Figure 6:
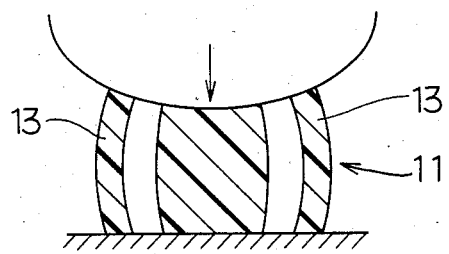
Figure 7:
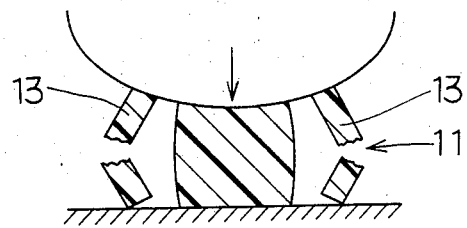

When a substantially spherical object collides downwardly against the impactive energy absorbing structure constructed as described above, the entirety of the energy absorbing member 11 first absorbs the impactive load L exerted thereon as shown in FIG. 6 until the amount of deformation of the energy absorbing member 11 reaches about 30%. When the amount of this deformation further increases, the external wall part 13 breaks as shown in FIG. 7, leaving the central part alone to bear the load L. This phenomenon will be described with reference to the energy absorption characteristic curve d of the cover member 16 inclusive of the insert 17, the energy absorption characteristic curve e of the energy absorbing member 11, and further the energy absorption characteristic curve f of the impactive energy absorbing structure as a whole, respectively indicated in the graph of FIG. 8. When the amount of transformation of the energy absorbing member 11 increases past about 30%, the external wall part 13 of the energy absorbing member 11 is broken as shown in FIG. 7, with the result that the energy absorption characteristic curve e of the energy absorbing member 11 goes down. The energy absorption characteristic curve d of the cover member 16, therefore, is affected by the increase in the amount of deformation and consequently in the load. In spite of this fact, the load in the energy absorption characteristic curve f of the impactive energy absorption structure substantially levels off at about 30% of the transformation. By equalizing this constant load and the prescribed maximum allowable load Lmax through selection of the shape and material of the energy absorbing member 11, therefore, the area $S_1$ enclosed with the curve f and the axis x, i.e. the amount $S_1$ of energy absorption, can be maximized.

Figure 1:
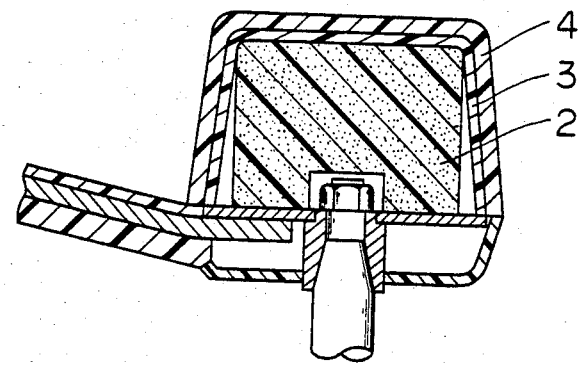
FIG. 1 is a cross-sectional view of a conventional impactive energy absorbing structure.
Figure 9:
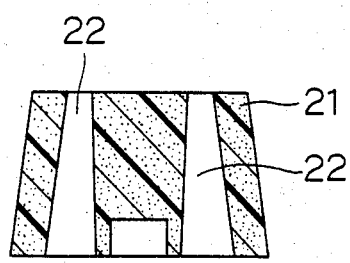
FIGS. 9–11 are cross-sectional diagrams of other typical examples of the energy absorbing member.
Figure 11:
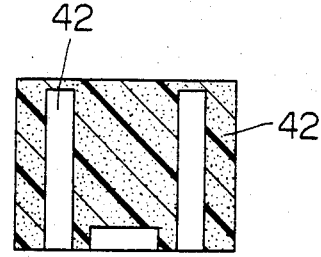
Figure 10:
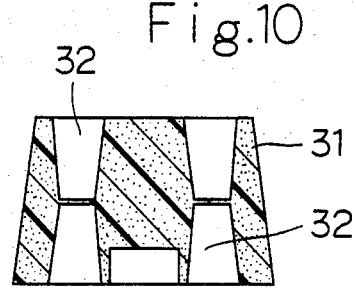
Figure 2:
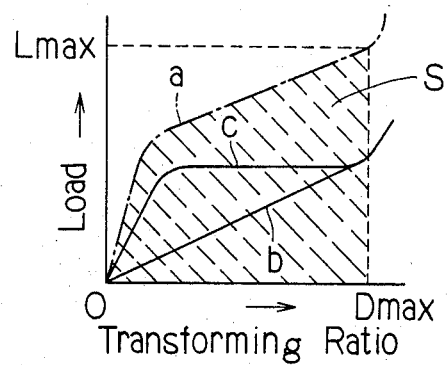
FIG. 2 is a graph showing the energy absorption characteristic curves of the aforementioned structure.

In the embodiment described above, the energy absorbing member 11 is portrayed as possessing a substantially cubic shape. Optionally, either of the energy absorbing members 21, 31 of a trapezoidal cross section as illustrated in FIG. 9 and FIG. 10 may be used instead. The energy absorbing member may incorporate therein either of empty spaces 22, 32 having a longitudinally converging cross section. The convergence of the empty spaces serves to give rise to mold release slope and improve moldability. Further, the empty spaces to be formed between the central part and the outer peripheral part of the energy absorbing member are not always required to be in a vertically through form. For example, empty spaces 32 closed at a level halfway along the entire height as illustrated in FIG. 10 may be used instead. Alternatively, empty spaces 42 closed in the upper part thereof as illustrated in FIG. 11 may be adopted.

As described above, the impactive energy absorbing structure of the present invention is enabled to maximize the amount of energy absorption and enhance the energy absorption efficiency because the empty spaces are interposed between the central part and the outer peripheral part of the energy absorbing member to give rise to an external wall part breakable under an impactive load in the outer peripheral part of the energy absorbing member.

We claim:

1. An impactive energy absorbing structure comprised of a first member having an axis and a first energy absorbing rate, a second member positioned about said first member so as to extend at least parallel to the axis of said first member and spaced horizontally therefrom, said second member having a second energy absorbing rate for absorbing energy simultaneously with said first member, and cover means for covering said first and second members, said first and second members each being comprised of a brittle plastic material and dimensioned so that under a predetermined load said second member will yield and break after which only said first member will absorb the load.

2. An impactive energy absorbing structure as in claim 1, wherein said first member has a height along its axis equal to H and wherein the horizontal thickness of said second member ranges from H/2 to about H/5.

3. An impactive energy absorbing structure as in claim 1, wherein said structure further includes rib means extending between said first and second members.

4. An impactive energy absorbing structure as in claim 3, wherein said rib means are provided at each of four spaced apart points about said first member.

5. An impactive energy absorbing structure as in claim 1, wherein said second member has a trapezoidal cross-sectional shape.

6. An impactive energy absorbing structure as in claim 5, wherein the space defined between said first and second members has a trapezoidal cross-section.

7. An impactive energy absorbing structure as in claim 1, wherein the space defined between said first and second members is closed over adjacent said cover.

8. An impactive energy absorbing structure as in claim 1 wherein the space defined between said first and second members is closed over.

9. An impactive energy absorbing structure as in claim 8 wherein the closed over area is positioned halfway along with height of said first and second members.

* * * * *